(12) United States Patent
Koyama et al.

(10) Patent No.: US 8,287,017 B2
(45) Date of Patent: Oct. 16, 2012

(54) ROBOT HAND AND METHOD FOR HANDLING PLANAR ARTICLE

(75) Inventors: Junji Koyama, Nagano (JP); Syunichi Tezuka, Nagano (JP); Kazuhiro Kosuge, Miyagi (JP); Yasuhisa Hirata, Miyagi (JP); Junya Ichinose, Miyagi (JP)

(73) Assignee: Harmonic Drive Systems Inc., Tokyo (JP)

( * ) Notice: Subject to any disclaimer, the term of this patent is extended or adjusted under 35 U.S.C. 154(b) by 26 days.

(21) Appl. No.: 12/737,769

(22) PCT Filed: Sep. 10, 2008

(86) PCT No.: PCT/JP2008/002499
§ 371 (c)(1),
(2), (4) Date: Feb. 14, 2011

(87) PCT Pub. No.: WO2010/029595
PCT Pub. Date: Mar. 18, 2010

(65) Prior Publication Data
US 2011/0133502 A1  Jun. 9, 2011

(51) Int. Cl.
*B66C 1/42* (2006.01)
(52) U.S. Cl. .................. 294/103.1; 901/31
(58) Field of Classification Search .......... 294/28, 294/32, 103.1, 104, 67.22; 414/729, 740; 901/31
See application file for complete search history.

(56) References Cited

U.S. PATENT DOCUMENTS

| | | | |
|---|---|---|---|
| 4,911,608 A * | 3/1990 | Krappitz et al. | 414/796 |
| 6,453,214 B1* | 9/2002 | Bacchi et al. | 700/245 |
| 6,817,641 B1* | 11/2004 | Singleton, Jr. | 294/106 |
| 7,443,115 B2* | 10/2008 | Okamoto et al. | 318/100 |
| 2006/0200274 A1 | 9/2006 | Watanabe et al. | |
| 2007/0216179 A1* | 9/2007 | Hirooka et al. | 294/103.1 |

FOREIGN PATENT DOCUMENTS

| | | |
|---|---|---|
| JP | 02-075730 | 6/1990 |
| JP | 2006-239811 | 9/2006 |
| JP | 2006-297514 | 11/2006 |
| JP | 2006-297542 | 11/2006 |
| JP | 2008-149448 | 7/2008 |
| WO | WO 2008/062625 | 5/2008 |

\* cited by examiner

*Primary Examiner* — Dean Kramer
*Assistant Examiner* — Stephen Vu
(74) *Attorney, Agent, or Firm* — Flynn, Thiel, Boutell & Tanis, P.C.

(57) ABSTRACT

When dishes are held by means of a robot hand (10), its fixed side engaging plate (13) and movable side engaging finger (14) are moved under horizontal state toward a dish (20) to be handled, and the outer circumferential edge side portion of the dish (20) is inserted between them. The distal end portion (14b) of the movable side engaging finger (14) is then bent by a predetermined amount to the side of the dish (20) and the robot hand (10) is raised. Consequently, the dish (20) is brought into a state where it is held by its own weight between the fixed side engaging plate (13) and the movable side engaging finger (14). Thereafter, the right and left first finger units (15, 16) are bent to the side of the dish (20) and the dish (20) is pushed by their dish pushing faces (15g, 16g), thus bringing about such a state as the dish (20) is held surely between the fixed side engaging plate (13) and the movable side engaging finger (14).

4 Claims, 13 Drawing Sheets

ROBOT HAND AND METHOD FOR HANDLING PLANAR ARTICLE

TECHNICAL FIELD

The present invention relates to a robot hand capable of securely holding and lifting a dining utensil such as a dish, a cooking utensil such as a frying pan, or another planar article, and moving the article to a desired location. The present invention also relates to a method for handling a planar article using the aforementioned robot hand.

BACKGROUND ART

Various robot hands have been proposed in recent years. In the current situation, however, there have been few proposals related to a robot hand suitable for handling a dining utensil such as a dish or bowl, or a cooking utensil such as a cooking pan or frying pan. For example, in a restaurant or other location where food is prepared, dishes that have leftover food and the like adhering thereto are stacked up and moved periodically to a dishwasher, a sink, or the like for washing. It is extremely difficult to cause a robot hand to hold each of the stacked dishes and move it to a destination such as a dishwasher or a sink.

If an attempt is made to hold a dish by a typical robot hand comprising a pair of holding claws as disclosed by, for example, Patent Document 1, the dish would be slippery due to the deposits on the dish surface, making it impossible to hold the dish securely and increasing the likelihood that the dish will be dropped and damaged during transport. If the holding force were increased in order to hold the dish so as to not drop it, an increased force would be applied and there would be a risk of breaking the dish when the dish is gripped. Meanwhile, it is conceivable to hold the dish without breaking it by using fingers equipped with a tactile sensor, as described in Patent Document 2; in such a case where the tactile sensor touches the leftover food attached to the dish, it is impossible to hold the dish with sufficient holding force, and there is a risk that the dish will be dropped.

[Patent Document 1] JP-A 2006-297514
[Patent Document 2] JP-A 2006-297542

DISCLOSURE OF THE INVENTION

Problems to be Solved by the Invention

There has not conventionally been a proposed method for handling a planar article, such as a dining utensil, capable of securely holding a dish or the like and moving it to a desired location by means of a simple mechanism. Nor has there been a proposed robot hand capable of securely holding a planar article such as a dining utensil by means of a simple mechanism.

An object of the present invention is to propose a method for handling a planar article capable of securely holding a dining utensil such as a dish, a cooking utensil such as a frying pan, and other planar articles, and moving such articles to a desired location.

Another object of the present invention is to propose a robot hand suitable for use in a method for handling such planar articles.

Means Used to Solve the Above-Mentioned Problems

FIGS. 1 through 6 are diagrams for describing a method and a robot hand for handling a planar article according to the present invention. The present invention is described below with reference to FIGS. 1 through 6 to facilitate understanding of the present invention, but the description is not intended to limit the present invention to the configurations brought forth in FIGS. 1 through 6.

Figure 1:
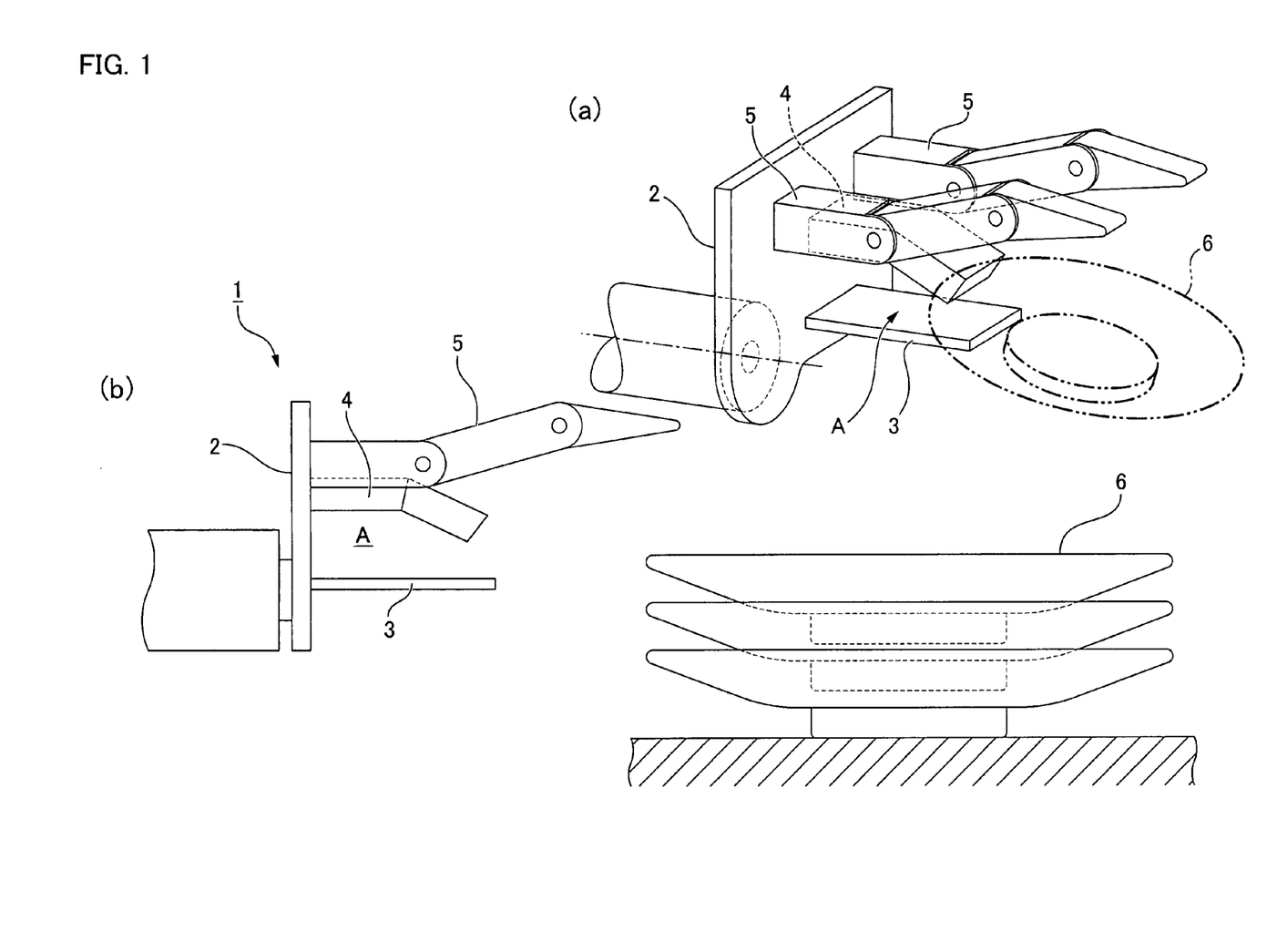
FIG. 1 is a diagram showing a robot hand according to the present invention.

First, as shown in FIG. 1, a robot hand 1 for use in the method according to the present invention has a palm member 2, a first engaging member 3 and a second engaging member 4, which are mounted on the palm member 2 at a predetermined distance from each other, and finger members 5 mounted on the palm member 2. A planar article 6 to be handled is, for example, a dish.

Figure 2:
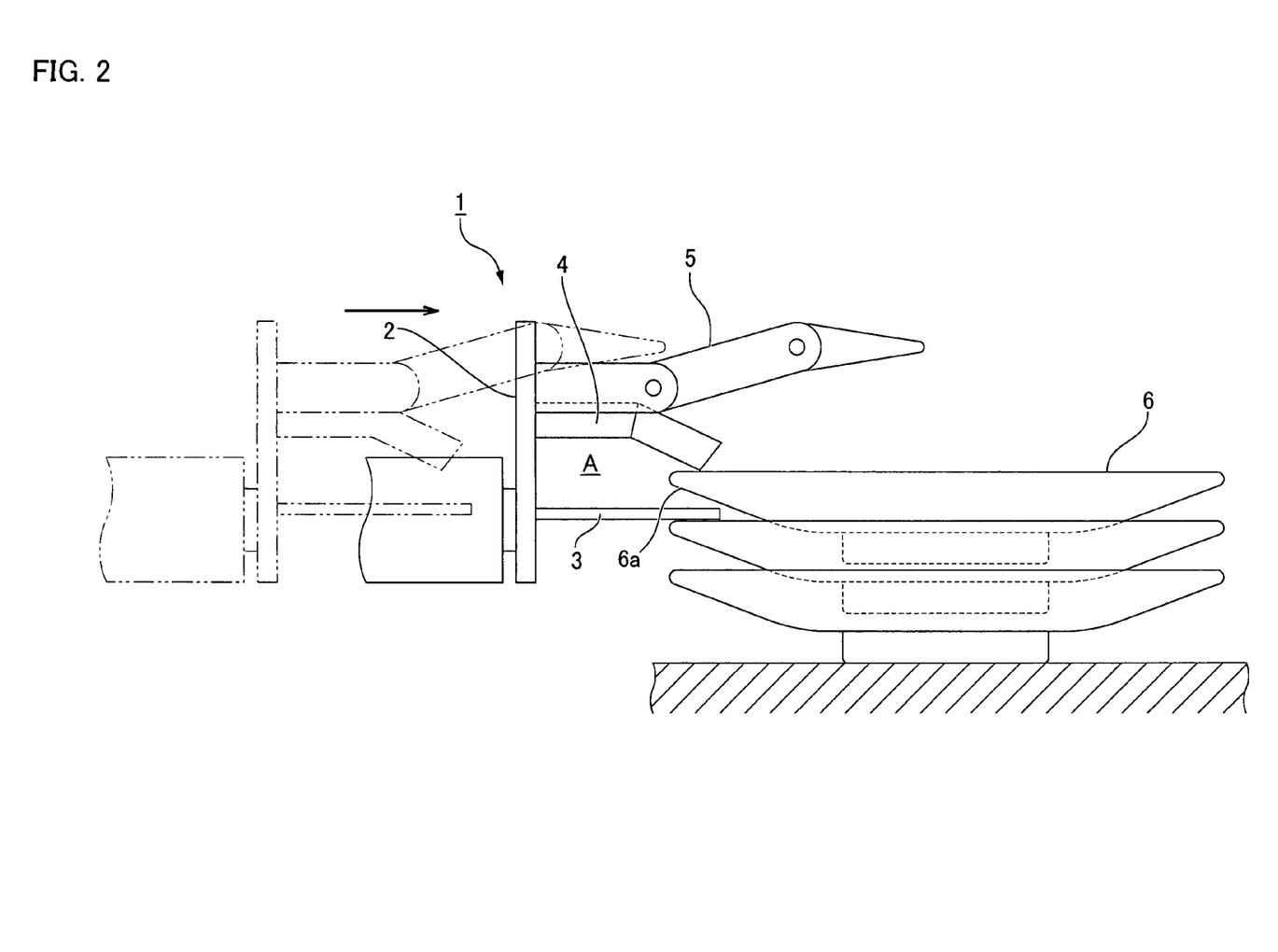
FIG. 2 is a diagram showing a state in which an outer circumferential portion of a dish is inserted between the engaging members of a robot hand.

In the method for handling the planar article 6 using the robot hand 1 according to the present invention, the robot hand 1 is moved toward the planar article 6 to be held, and a part 6a of the planar article 6 to be held is inserted between the first engaging member 3 and second engaging member 4, as shown in FIG. 2.

Here, the direction or orientation of the robot hand 1 is changed prior to inserting the planar article 6 or after inserting the planar article 6 so that the first engaging member 3 is positioned under the second engaging member 4. In the present example, the robot hand 1 is retained in advance so as to be oriented in this manner, as shown in FIG. 1, and then the insertion operation is carried out. In a case in which, for example, the robot hand 1 is vertically lowered from above and inserted relative to the planar articles 6 in a lateral stack, the robot hand 1 should be changed in its orientation by rotating it toward horizontal direction so that the first engaging member is positioned lower side.

Figure 3:
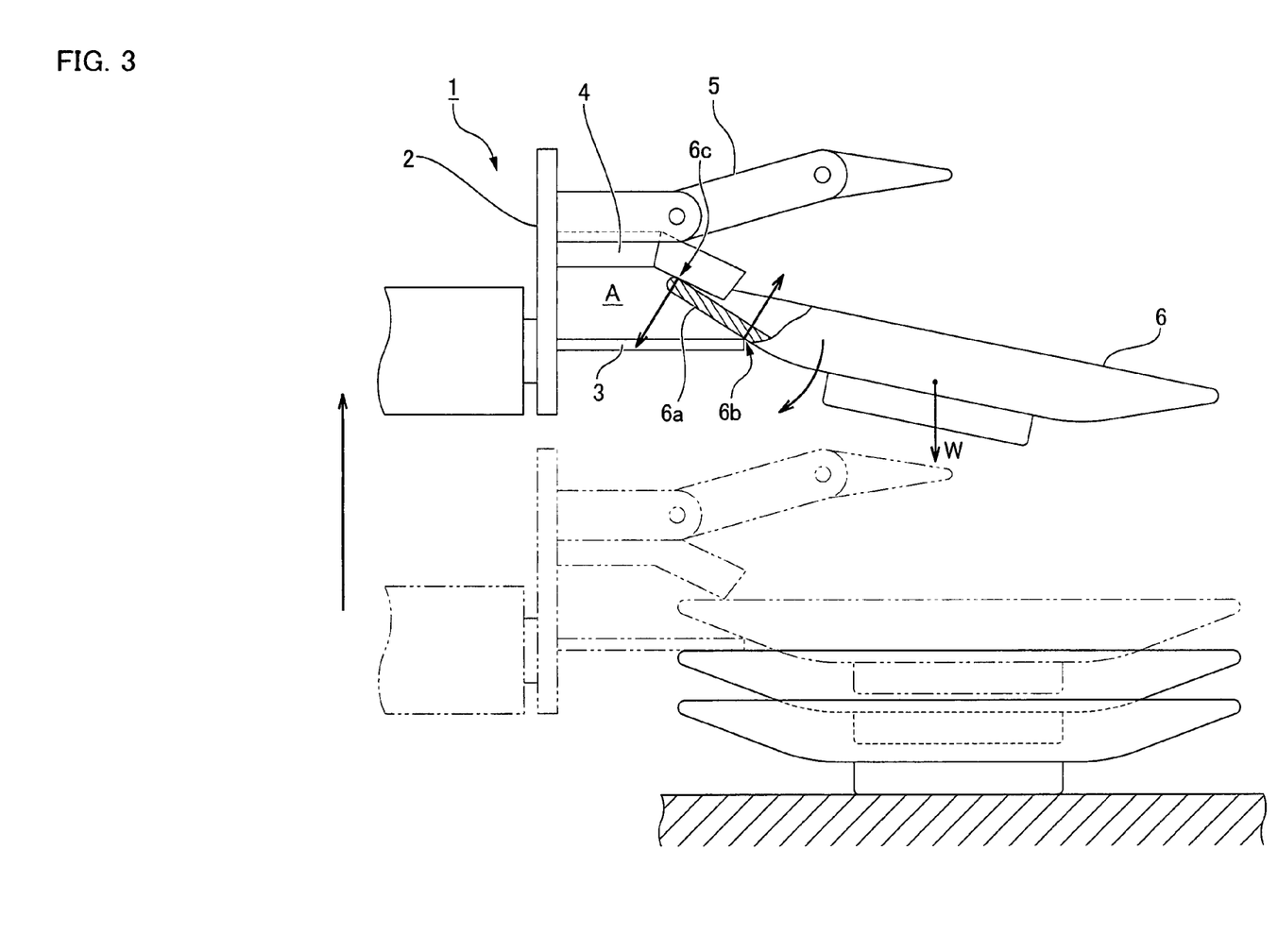
FIG. 3 is a diagram showing a state in which the dish is lifted and retained between the engaging members.

After the insertion operation, the robot hand 1 is lifted while the first engaging member 3 is kept on the underside as shown in FIG. 3. The planar article 6 is thereby swung by its own weight W around a part supported by the first engaging member 3 on a lower side, used as a pivot point 6b, and the end part 6c of a part 6a of the planar article 6, namely, the part 6a that is inserted between the first and second engaging members 3 and 4, is pressed against the second engaging member 4 on an upper side from below. As a result, a retention state is established in which the planar article 6 is retained between the first and second engaging members 3 and 4 by its own weight W.

Figure 4:
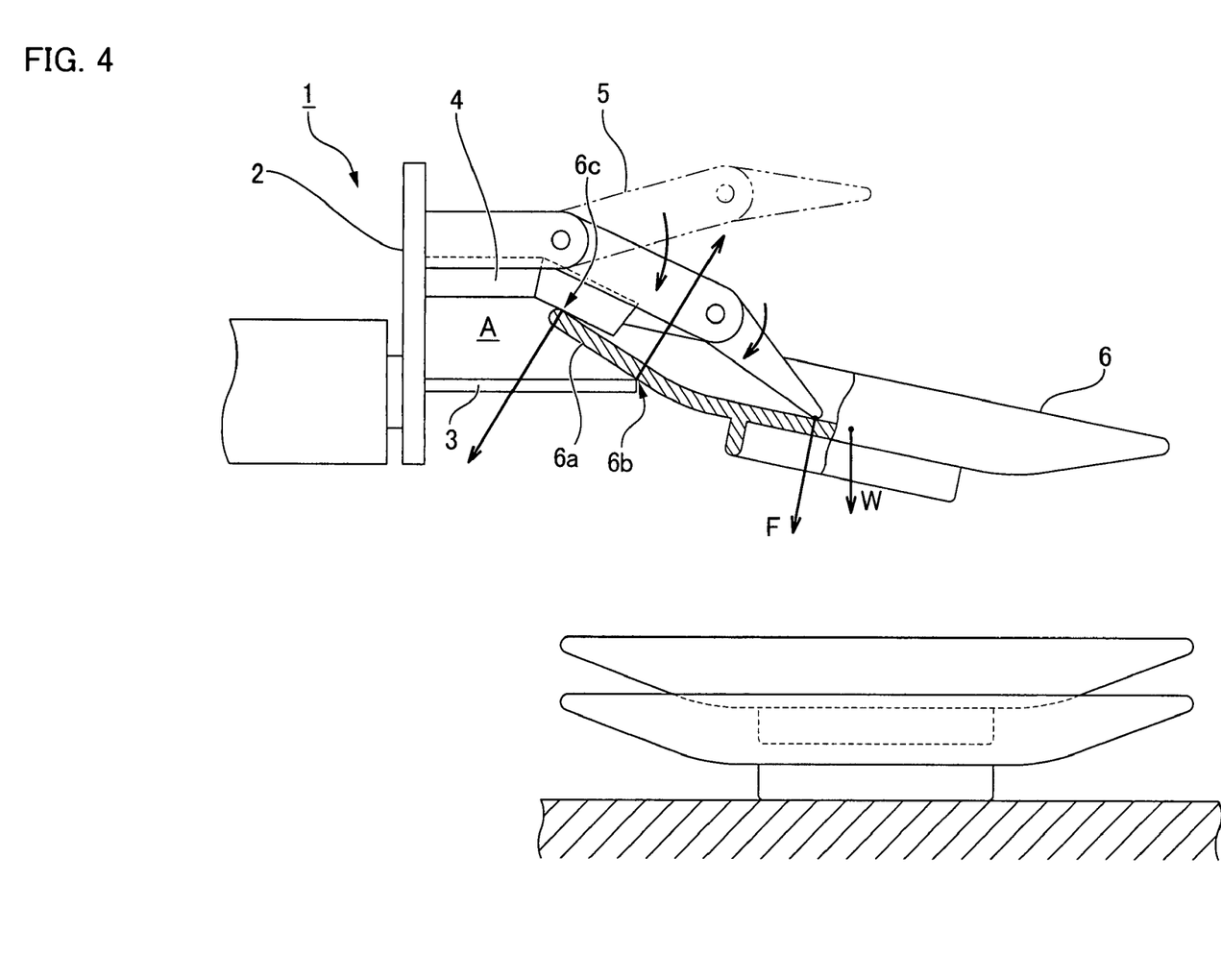
FIG. 4 is a diagram showing a held state in which the dish is pressed down by a finger member.

Then, a part of the planar article 6, that is, the part extending from between the first and second engaging members 3 and 4, is pressed by the finger members 5 from above, as shown in FIG. 4. A retention state is thereby established in which the planar article 6 is securely retained by the first and second engaging members 3 and 4 from above and below.

Figure 5:
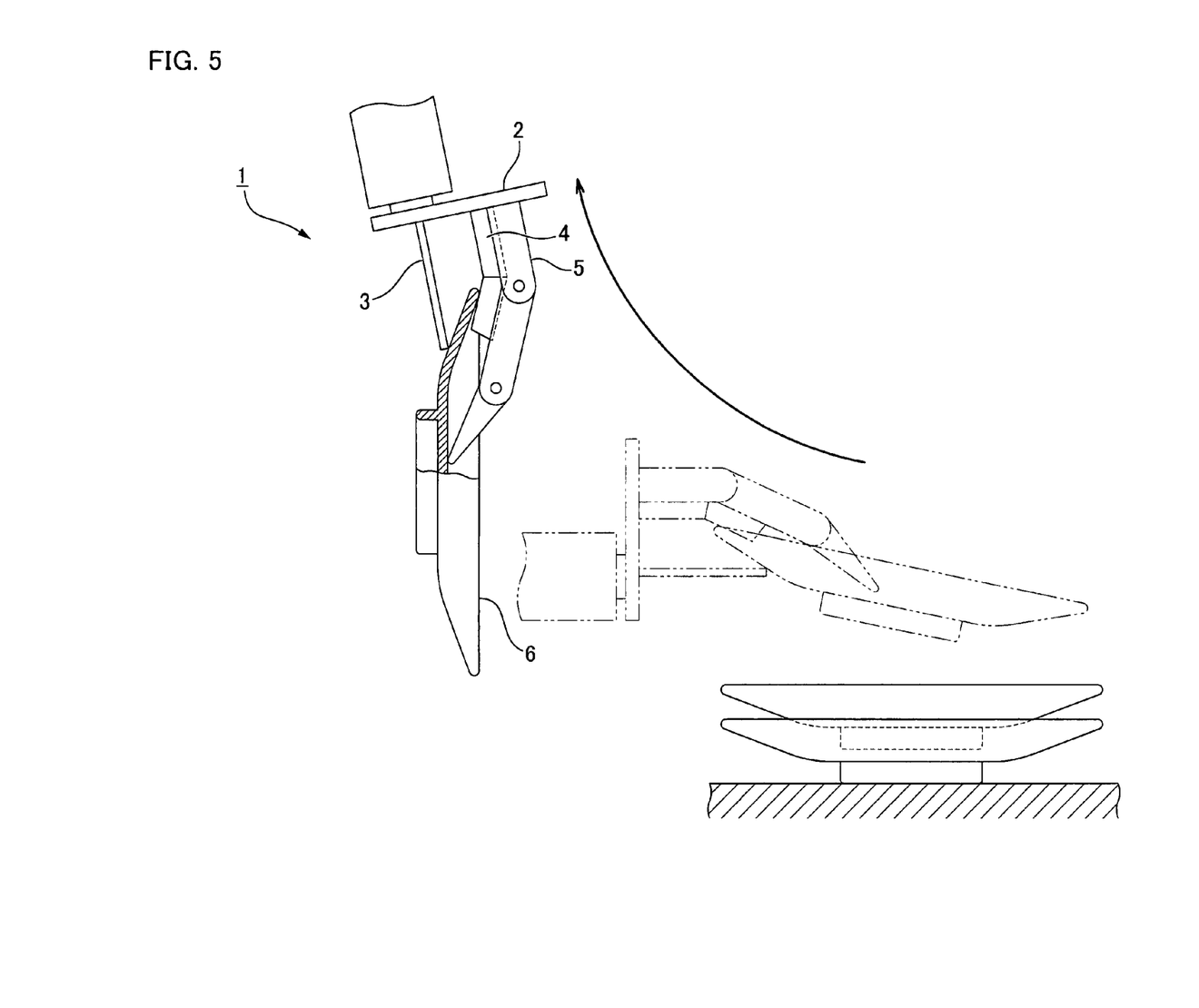
FIG. 5 is a diagram showing a state in which the held dish is transported.

After the retention state is established, it is possible to further lift the robot hand 1 and to move the planar article 6 to the desired position while the planar article 6 is held in a suspended state, as shown in FIG. 5.

Figure 6:
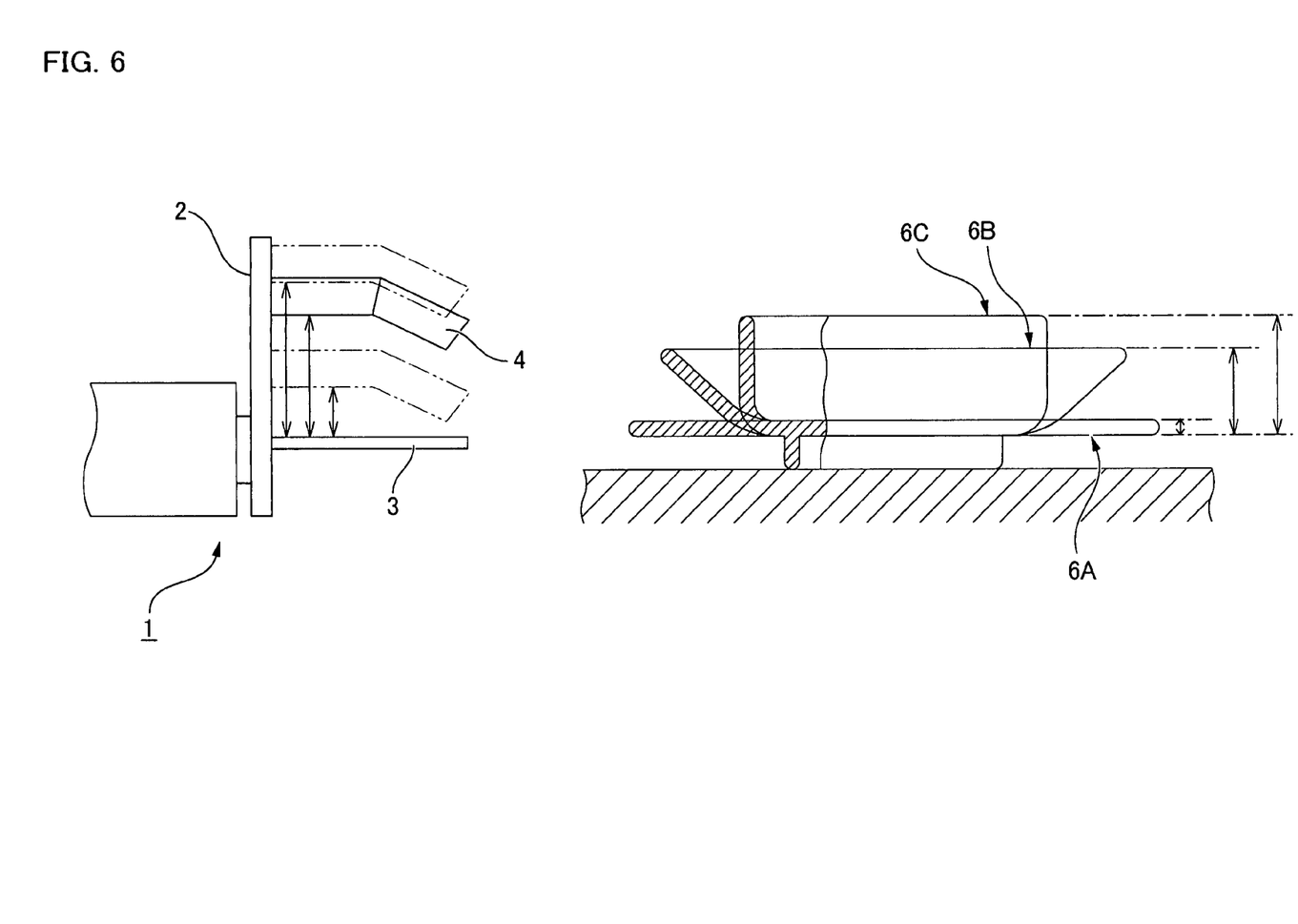
FIG. 6 is a diagram showing the distance adjustment mechanism of the engaging members.
Figure 7:
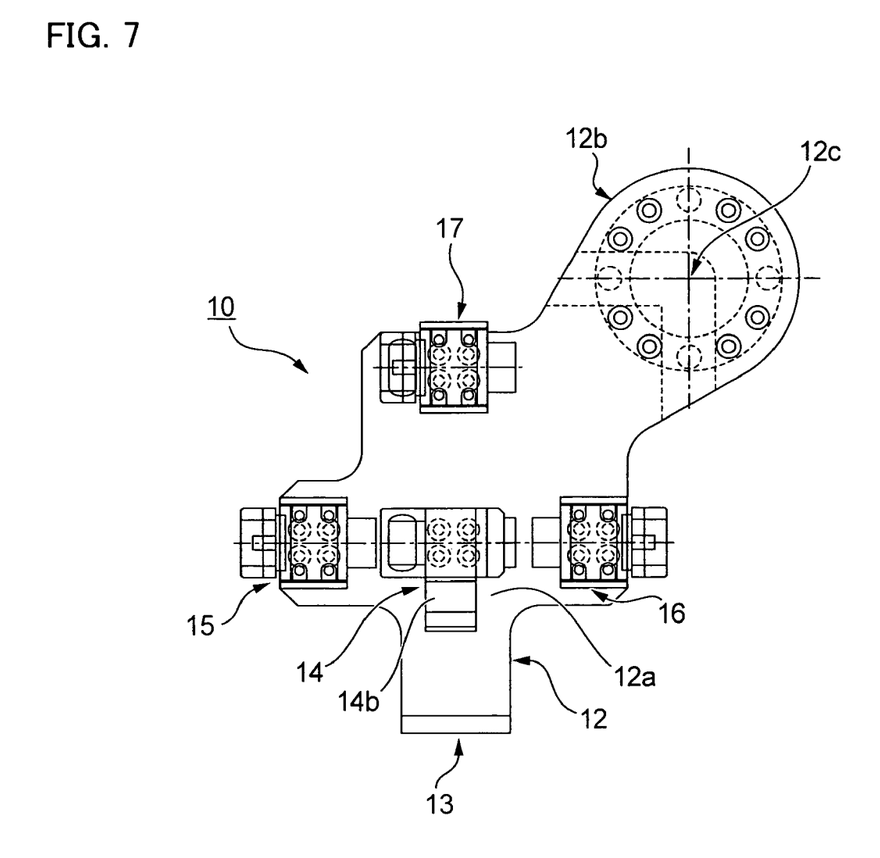
FIG. 7 is a front view of a robot hand to which the present invention is applied.

The method for handling a planar article according to the present invention is characterized by adjusting the gap between the first engaging member and second engaging member in accordance with the size of the planar article to be held. In a case in which planar articles 6 having different shapes are held, as shown in FIG. 6, the gap between the first and second engaging members 3 and 4 is preferably adjusted so as to allow each of the planar articles 6A through 6C to be inserted between the first and second engaging members 3 and 4. Such a configuration is also preferred because, when the held planar article is released from between the first and second engaging members, the planar article can be released quickly by opening the members.

With the method for handling a planar article according to the present invention, the planar article 6 in a held state as shown in FIG. 5 can, for example, be released from the first engaging member 3 and the second engaging member 4 and placed in a designated location by moving the finger members 5 away from the planar article 6 and opening the first engaging member 3 and the second engaging member 4 relative to each other.

The method for handling a planar article according to the present invention is suitable for handling dishes as shown in FIGS. 1 to 6 and other dining utensils, or similarly shaped cooking pans, frying pans, and other cooking utensils.

Next, a robot hand 1 according to the present invention is characterized by comprising:

a palm member 2;

a first engaging member 3 mounted on the palm member;

a second engaging member 4 mounted on the palm member;

an article insertion groove A formed between and defined by the first engaging member 3 and the second engaging member 4; and a first finger member 5 mounted on the palm member 2, wherein the first finger member 5 is positioned on the same side as the second engaging member 4 in relation to the article insertion groove A;

a distal end portion of the first finger member 5 can be moved toward the first engaging member 3 from an initial position on the side of the second engaging member 4;

when a part 6a of the planar article 6 is inserted into the article insertion groove A in a state in which the first engaging member 3 is positioned underneath the second engaging member 4, the planar article 6 is swung under its own weight about the distal end portion of the first engaging member 3, used as a pivot point; the end part 6c of the planar article 6 positioned within the article insertion groove A is pressed, from a lower side, against the second engaging member 4; and a retention state is established in which the planar article 6 is retained between the first and second engaging members 3 and 4; and an article-holding state is established in which the planar article 6 is pressed against the first engaging member 3 and the second engaging member 4 when a distal end portion of the first finger member 5 is moved from the initial position toward the first engaging member 3 and is pressed against a part of the planar article 6 that projects from the article insertion groove A in a state in which the planar article 6 is retained between the first and second engaging members 3 and 4.

In the robot hand 1 according to the present invention, the first engaging member 3 and the second engaging member 4 are preferably opened and closed relative to each other.

In the robot hand 1 according to the present invention, it is possible to use a multi-jointed finger member for the first finger member 5. It is possible to increase the moving range of the distal end portion of the first finger member 5 by bending the finger around individual joints as the pivot point, making it possible for the distal end portion to press various planar articles having different forms and sizes.

The robot hand 1 according to the present invention preferably has at least two finger members placed on both sides of the second engaging member 4 as the first finger member 5, making it possible to firmly establish a held state of a planar article by pressing the article from both sides of the second engaging member.

Next, the robot hand 1 according to the present invention is characterized by having at least one second finger member mounted on the palm member 2, wherein the second finger member is positioned opposite the first finger member at a predetermined distance on the opposite side of the article insertion groove, and the first finger member and the second finger member can be opened and closed relative to each other as shown in an embodiment described later.

The robot hand of the present configuration is capable of holding a cup, a ball, or the like between the first and second finger members.

In this case, the first finger member is preferably configured so that a distal end portion can be bent toward both the article insertion groove and the second finger member at a pivot point that is on at least one of the joints, and so that a distal end portion of the second finger member can be bent toward the first finger member at a pivot point that is on at least one of the joints. The first finger member, by being bent toward one side at the joint as described above, is able to hold a planar article, and, by being bent toward the opposite side, is able to hold an article such as a cup or ball between the first finger member and second finger member.

Further, the palm member is preferably configured so that the palm member can be swung around a pivot point at a position offset from the mounting center of the first finger member and second finger member. With the present configuration, it is possible to increase the moving ranges of the first and second finger members associated with the swing of the palm member, thereby benefiting the article holding operation.

Further, the first engaging member preferably has a body, and a distal end portion that constitutes the pivot point for supporting the planar article, with the distal end portion detachably mounted on the body. It is possible to firmly hold diverse forms of planar articles by changing the distal end portions in accordance with the form and size of the planar article to be held.

Effect of the Invention

According to the present invention, a state is established in which a planar member is retained between a first engaging member and a second engaging member, by inserting a part of the planar member between a pair of first and second engaging members so as to utilize the weight of the planar member itself. Then, a state is established in which the planar member is securely held by the first and second engaging members, by pressing the retained planar member using a finger member.

In, a case in which a planar member is directly held from both sides using a pair of holding claws, the planar member will likely slip and drop from between the claws due to the surface shape, surface condition, and the like, of the planar article that is held by the holding claws. In contrast, according to the present invention, a state is established in which a planar article is retained between a pair of first and second engaging members, and then a finger member is pressed down, making it possible to establish a state in which the planar article is readily and securely held.

The method and robot hand according to the present invention is particularly suitable to handling dining utensils such as dishes, and the like, and cooking utensils such as frying pans, and the like.

BEST MODE FOR CARRYING OUT THE INVENTION

An example of a robot hand to which the present invention applied is described below with reference to FIGS. 7 through 12.

<Description of Structure>

FIGS. 7 through 10 are the front view, side view, bottom view, and partial side-view diagrams together showing an example of a robot hand to which the present invention is applied. The robot hand 10 of the present example has a palm plate 12, with a fixed side engaging plate 13 (a first engaging member), which is extended forward at right angles, and is mounted on the lower end of the surface 12a of the palm plate 12. A movable side engaging finger 14 (second engaging member) having a single joint is mounted on a central part of the surface 12a of the palm plate 12. The movable side engaging finger 14 extends forward at right angles from the surface 12a of the palm plate 12, and is opposite from the fixed side engaging plate 13 at a predetermined distance. An article insertion groove A is defined between the movable side engaging finger 14 and fixed side engaging plate 13. First and second finger units 15 and 16, each having two joints, are mounted on, and extended forward at right angles from, the surface 12a of the palm plate 12 on the left and right sides of the movable side engaging finger 14, respectively. A second finger unit 17, having two joints, is arranged on the upper side of the movable side engaging finger 14. The second finger unit 17 is also mounted on the surface 12a of the palm plate 12 and extended forward therefrom at right angles.

The palm plate 12 has a wrist joint unit 12b projected diagonally upward from the region where the aforementioned individual members are mounted. An arm unit 18 shown by the imaginary lines is connected onto the backside of the wrist joint unit 12b. The palm plate 12 connected to the arm unit 18 can be swung around via the swing axis 12c of the wrist joint unit 12b as the pivot point, using a drive mechanism provided for the arm unit.

The fixed side engaging plate 13, being a plate having a predetermined width and thickness overall, has a body plate 13a, which is made of metal such as aluminum and the rear end of which is fixed to the palm plate 12; and an attachment 13b made of plastic such as polyacetal and mounted on the distal end of the body plate 13a. The attachment 13b is fixed onto the body plate 13a using screws 13c, allowing easy replacement of the attachment 13b. In the present example, the planar article to be handled is a circular dish, and therefore the contour of the distal end of the attachment 13b is shaped as a slightly concave circular arc.

Figure 10:
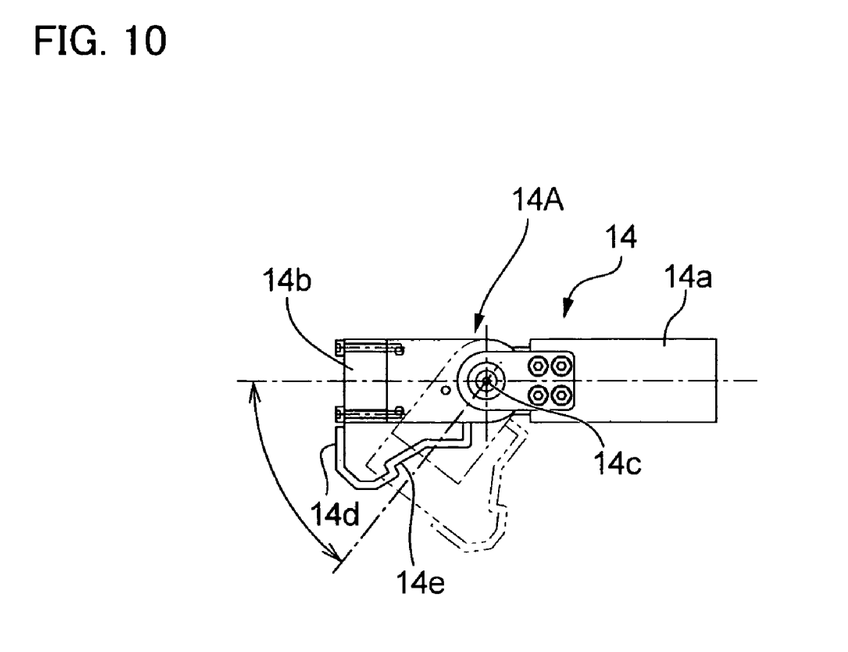
FIG. 10 is a side view of the moving side-engaging finger of the robot hand shown in FIG. 7.
Figure 11:
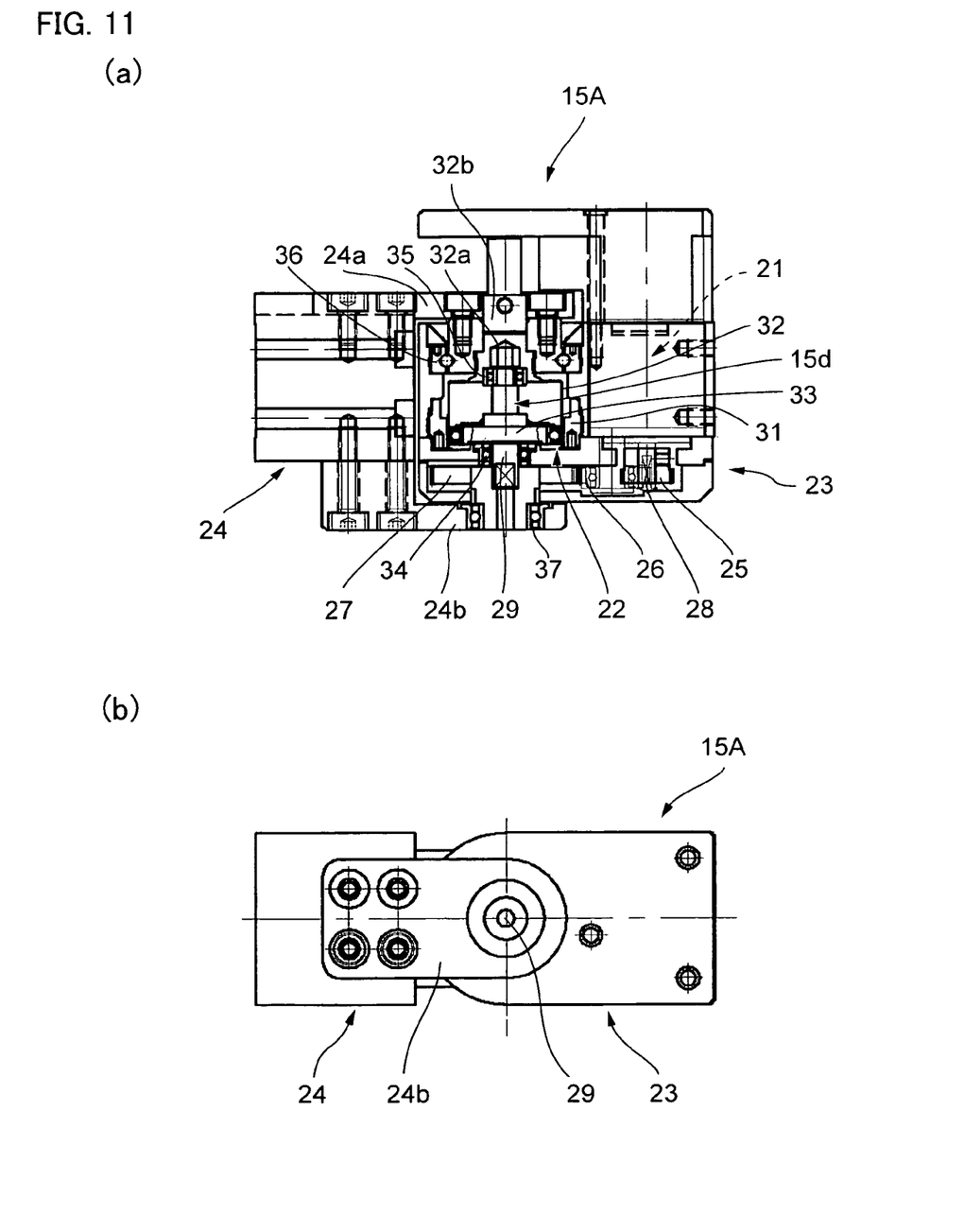
FIG. 11 is a cross-sectional diagram and side view showing the joint unit of a finger unit.

As shown in FIG. 10, the movable side engaging finger 14 has a root portion 14a of which the rear end is fixed onto the palm plate 12, and a distal end portion 14b connected to the distal end of the root portion 14a via a joint unit 14A. The distal end portion 14b can be bent downward from the initial position, in which the distal end portion 14b is horizontally extended as indicated in FIG. 10, around the joint shaft 14c of the joint unit 14A, used as the pivot point, allowing a maximum bending angle of, for example, 45 degrees. A surface of the distal end portion 14b, the surface opposite the fixed side engaging finger 13, has an inclined surface projecting toward the fixed side engaging member 13 oriented towards the distal end. The inclined surface constitutes a dish engaging surface 14e to which a flexible material 14d made of an elastic or rubber sheet is affixed.

Figure 8:
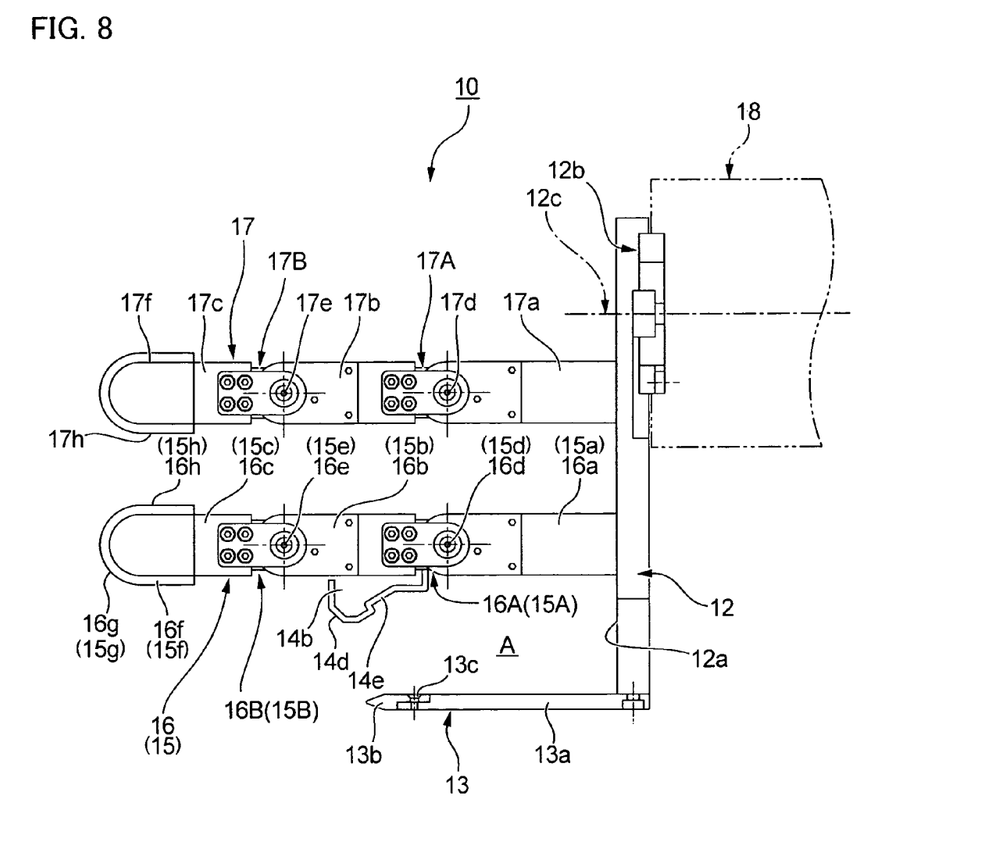
FIG. 8 is a side view of the robot hand shown in FIG. 7.
Figure 9:
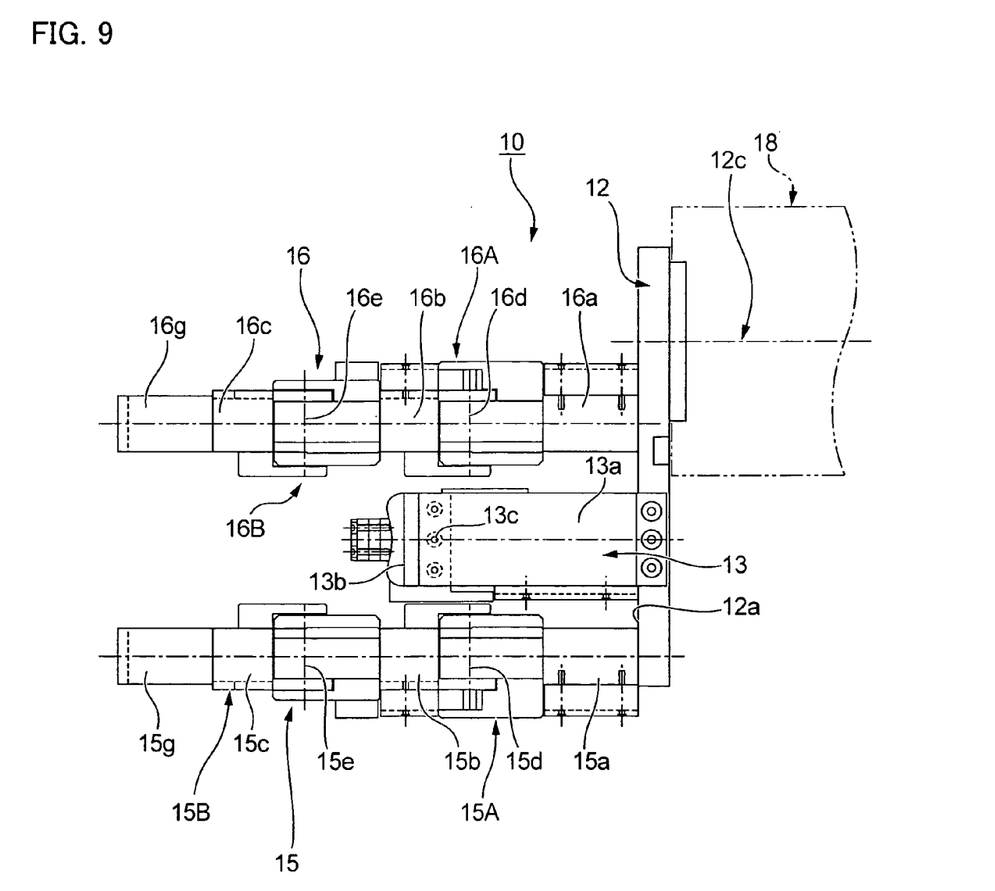
FIG. 9 is a bottom view of the robot hand shown in FIG. 7.

First finger units 15 and 16 on the left and right sides have the same structure, and are arranged in mirror symmetry. The first finger units 15 and 16 have root finger portions 15a and 16a fixed onto the palm plate 12, intermediate finger portions 15b and 16b connected to the distal end of first finger units 15 and 16 by way of joint units 15A and 16A, and distal end finger portions 15c and 16c connected to the distal end of the intermediate finger portions 15b and 16b by way of joint units 15B and 16B. The intermediate finger portions 15b and 16b can be bent in an up and down direction as indicated in FIG. 8 (toward the fixed side engaging plate 13 and the second finger unit 17), using the joint shafts 15d and 16d of the joint units 15A and 16A as the pivot points. The distal end finger portions 15c and 16c can also be bent in an up and down direction as indicated in FIG. 8 (toward the fixed side engaging plate 13 and the second finger unit 17) using the joint shafts 15e and 16e of the joint units 15B and 16B as the pivot points. As is clear from FIG. 8, the distal end portion of the distal end finger portions 15c and 16c each has a contour of a semicircle when seen in a side view, and flexible materials 15f and 16f, which are similar to the dish engaging surface 14e of the movable side engaging finger 14, are adhered to the aforementioned distal end portion. The surfaces of the distal end portion on the side of the fixed side engaging plate 13 function as dish pushing faces 15g and 16g. Meanwhile, as described later, the surfaces of the distal end portion on the side of the second finger unit 17 function as cup holding surfaces 15h and 16h.

The second finger unit 17 has the same structure as the first finger units 15 and 16, having a root finger portion 17a fixed onto the palm plate 12, an intermediate finger portion 17b connected to the distal end by way of a joint unit 17A, and a distal end finger portion 17c connected to the distal end by way of a joint unit 17B. The intermediate finger portion 17b can be bent in an up and down direction (the direction toward and away from the first finger units 15 and 16), as indicated in FIG. 8, using the joint shaft 17d of the joint unit 17A as the pivot point. The distal end finger portion 17c can also be bent to the in an up and down directions (the direction toward and away from the first finger units 15 and 16), as indicated in FIG. 8, about using the joint shaft 17e of the joint unit 17B as the pivot point. The distal end portion of the distal end finger portion 17c has a contour of a semicircle when seen in a side view, and functions as a cup holding surface 17h to which a flexible material 17f is adhered.

<Structure of a Joint Unit of a Finger Unit>

FIG. 11(a) is a cross-sectional diagram of the internal structure of the joint unit 15A of the first finger unit 15; and FIG. 11(b) is a diagram showing a side view of the joint unit 15A. Other joint units 15B, 16A, 16B, 17A, 17B, and 14A have the same structure.

The joint unit 15A has a housing 23 for accommodating a motor 21 and a reducer 22, and a connecting arm 24 connected to the housing 23 in a manner allowing rotation centered around the joint shaft 15d. The housing 23 is linked and fixed in place coaxially to the root finger portion 15a of the first finger unit 15, and the connecting arm 24 is linked and fixed in place coaxially to the intermediate finger portion 15b of the first finger unit 15.

The torque of the motor 21 is transmitted to the reducer 22 by way of a driving gear 25, a transmission gear 26 meshed with the driving gear 25, and a driven gear 27 meshed with the transmission gear 26. The driving gear 25 is linked and fixed in place coaxially to the output shaft 28 of the motor 21, and the driven gear 27 is linked and fixed in place coaxially to the input shaft 29 of the reducer 22.

The reducer 22 of the present embodiment is a wave gear reducer, and has a circular rigid internally toothed gear 31 fixed onto the housing 23, a cup-shaped flexible externally toothed gear 32 coaxially disposed inside the internally toothed gear 31, and a wave generator 33, which has a contour of an ellipse and is inserted into the flexible externally toothed gear 32. The wave generator 33 is linked and fixed onto the input shaft 29 extended through the center thereof. The input shaft 29 is freely and rotatably supported by the housing 23 via a bearing 34. The distal end portion of the input shaft 29 is freely and rotatably supported by a portion of a boss 32a defining the bottom of the cup of the cup-shaped flexible externally toothed gear 32 via a bearing 35.

An output shaft 32b is coaxially formed on the boss 32a of the flexible externally toothed gear 32, and is linked and fixed onto a part 24a on one side facing the connecting arm 24. The boss 32a is also freely and rotatably supported by the housing 23 via a bearing 36. A part 24b on the other side of the connecting arm 24 is freely and rotatably centered around the input shaft 29, supported via a bearing 37. The joint shaft 15d is defined by the output shaft 32b.

When the motor 21 is rotated, the rotation is transmitted to the input shaft 29 of the reducer 22, with the speed thereof reduced by the reduction gear train (25, 26, 27). When the wave generator 33, which is linked and fixed coaxially to the input shaft 29, is rotated, the meshing position of the flexible externally toothed gear 32 and rigid internally toothed gear 31 is moved in a circumferential direction, and a relative rotation proportional to the difference between the numbers of teeth between the aforementioned two gears is generated. Because the rigid internally toothed gear 31 is on the fixed side, the flexible externally toothed gear 32 is rotated, and the connecting arm 24 connected to the output shaft 32b that is connected to the flexible externally toothed gear 32 is swung, centered around the output shaft 32b (joint shaft 15d).

Meanwhile, in the case of the joint unit 14A, as is clear from FIG. 10, the flexible externally toothed gear 32 is on the fixed side, causing the housing 23 accommodating the rigid internally toothed gear 31 to swing.

<Description of Operation for Holding a Dish>

Figure 12:
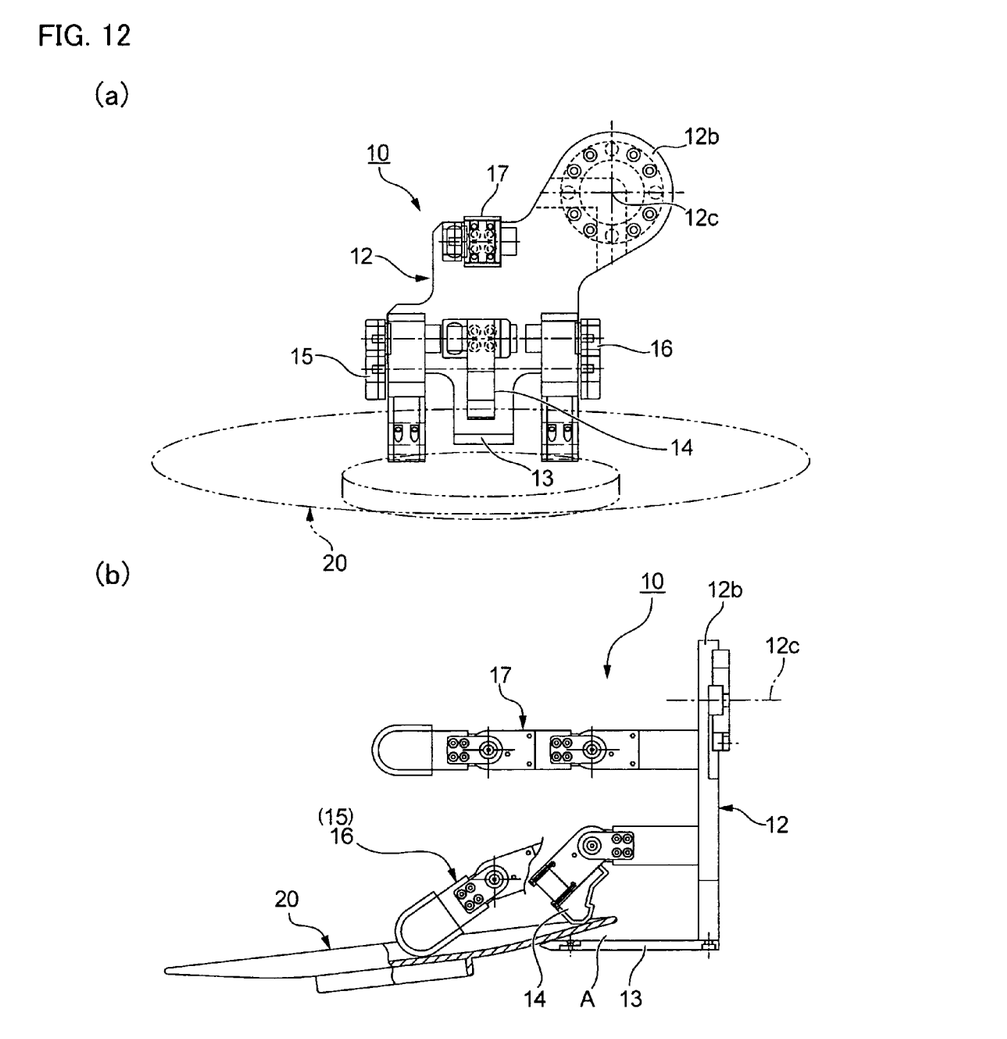
FIG. 12 is a diagram showing a state in which a dish is held by the robot hand shown in FIG. 7.

An example of the operation for holding a shallow circular dish 20 using the robot hand 10 is described with reference to FIG. 12. FIG. 12(a) is a front view showing a state of the dish 20 being held; and FIG. 12(b) is the side view.

First, the fixed side engaging plate 13 and movable side engaging finger 14 are moved toward the dish 20 to be handled in a horizontal state, and an outer circumferential portion of the dish 20 is inserted between the aforementioned members. Next, the distal end portion 14b of the movable side engaging finger 14 is bent toward the dish 20 by a predetermined amount, and then the robot hand 10 is lifted. As a result, a state is established in which the dish 20 is held, as shown in FIG. 12. Thereafter, the left and right first finger units 15 and 16 are bent toward the side of the dish 20, and the dish 20 is pressed by the dish pushing faces 15g and 16g of the first finger units 15 and 16. Accordingly, a state is established in which the dish 20 is firmly held between the fixed side engaging plate 13 and movable side engaging finger 14.

<Description of Operation for Holding a Cup>

Next, the robot hand 10 of the present embodiment is also capable of holding a cup or the like. Specifically, various articles can be held using the first finger units 15, 16 and the second finger unit 17.

Figure 13:
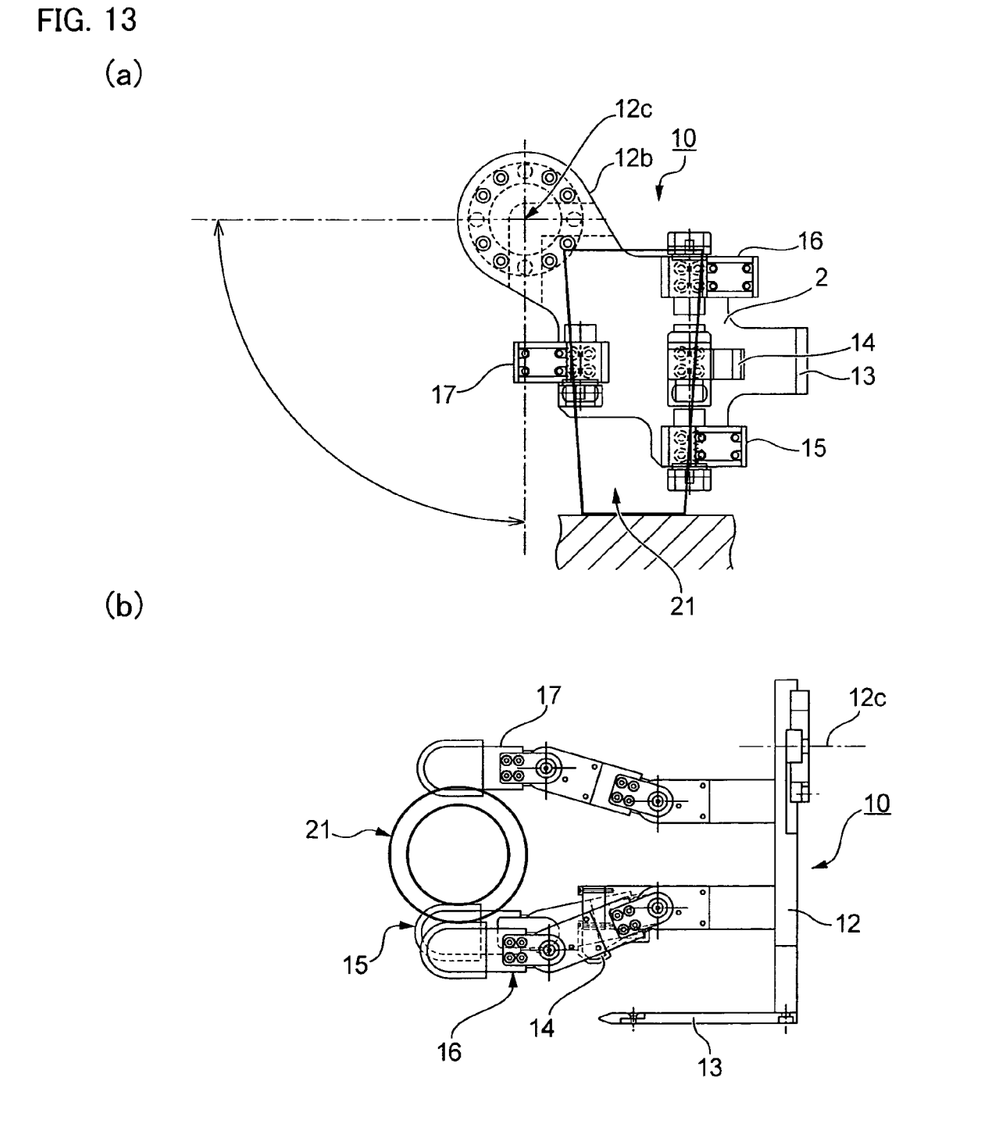
FIG. 13 is a diagram showing a state in which a cup is held by the robot hand shown in FIG. 7.

FIG. 13 is a diagram showing a state in which a cup is held by the robot hand 10, and (a) is the front view and (b) the plan view. When an attempt is made to hold, for example, a cup 21 on a table, the robot hand 10 is swung 90 degrees from the state shown in FIG. 12(a) centered around the swing axis 12c. As a result, a state is established in which the first finger units 15, 16 and the second finger unit 17 are lined up horizontally. In this state, the first finger units 15 and 16 and the second finger unit 17 are opened so that the cup 21 may come between the finger units. Then, the robot hand 10 is lowered to position the cup 21 between the finger units, the first finger units 15 and 16 and the second finger unit 17 are closed relative to each other, and the cup 21 is held between the finger units. As described above, the first finger units 15, 16 are moved toward the fixed side engaging plate 13 to press the dish 20, and are moved in the opposite direction to hold a cup 21 or the like.

As described above, the robot hand 10 of the present embodiment is able to hold a cup or the like as well as a dish or the like. Also, the palm plate 12 has a wrist joint shaft that swings, centered around a position (12c) offset from the center of the three finger units, allowing the finger units to move in a wide range and benefiting the holding operation.

Other Embodiments

Holding a dish or cup has been described in the examples above; however, as shall be apparent, it is also possible to use the robot hand of the present invention for holding other planar articles, spheres, cylinders or the like.

Meanwhile, two first finger units and a single second finger unit are disposed in the example described above; a single first finger unit, or three or more first finger units may be disposed. Likewise, two or more second finger units may also be disposed. Furthermore, the finger units disposed in the present embodiment have two joints; the finger units may have a single joint, or three or more joints. Likewise, the movable side engaging finger 14 may also have a plurality of joints, in place of a single joint.

Furthermore, a characteristic of the present invention is that a planar article (6 or 20) to be held is inserted between the first engaging member (3 or 13) and second engaging member (4 or 14), and that the planar article is lifted while the article is retained between the two engaging members. Therefore, a pressing member(s), other than the finger unit having the two joints described above, can also be used for the finger member (5, 15, 16) in order to press the planar article inserted between the first engaging member and second engaging member. For example, as shall be apparent, a finger member (pressing member) moved by a drive mechanism such as an air cylinder may also be used.

In the example described above, the fixed side engaging plate 13 and movable side engaging finger 14 are used as a set;

both fingers may be configured to be movable, or the movable and fixed sides may be reversed.

The invention claimed is:

1. A method for handling a planar article (6, 20) using a robot hand (1, 10) which has a palm member (2, 12), a first engaging member (3, 13) and a second engaging member (4, 14) mounted on the palm member (2, 12) at a predetermined gap from each other, and a finger member (5, 15, 16) mounted on the palm member (2, 12), the method characterized in comprising:

moving the robot hand (1, 10) toward a planar article (6, 20) to be held and inserting a part (6*a*) of the planar article (6, 20) to be held between the first engaging member (3, 13) and the second engaging member (4, 14);

changing a direction or orientation of the robot hand (1, 10) so that the first engaging member (3, 13) is positioned underneath the second engaging member (4, 14) prior to the operation to insert the planar article (6, 20) or after the inserting operation;

lifting the robot hand (1, 10) to cause the planar article (6, 20) to be swung under the weight thereof around a part, used as a pivot point (6*b*), supported by the first engaging member (3, 13) on a lower side from below; and pressing against the second engaging member, against the second engaging member (4) on an upper side, an end part (6*c*) of a portion (6*a*) of the planar article (6, 20) inserted between the first and second engaging members (3, 4), so that there is formed a retention state in which the planar article (6, 20) is retained between the first and second engaging members (3, 4, 13, 14) under the weight of the planar article; and pressing against the second engaging member, from an upper side from below, a portion of the planar article (6, 20) projecting from between the first and second engaging members (3, 4, 13, 14)) using the finger member (5, 15, 16), thereby forming a held state in which the planar article (6, 20) is held under the weight thereof by the first and second engaging members (3, 4, 13, 14).

2. The method for handling a planar article according to claim 1, characterized in comprising:

adjusting a gap between the first engaging member (3, 13) and the second engaging member (4, 14) in accordance with the dimensions of the planar article (6, 20) to be held.

3. The method for handling a planar article according to claim 1, characterized in further comprising:

moving the finger member (5, 15, 16) away from the planar article (6, 20) and opening the first engaging member (3, 13) and the second engaging member (4, 14) relative to each other, thereby releasing the planar article (6, 20) in the held state from between the first engaging member (3, 13) and the second engaging member (4, 14).

4. The method for handling a planar article according to claim 1, characterized in that:

the planar article (6, 20) is a dining utensil, or a cooking utensil.

* * * * *